Patented May 16, 1950

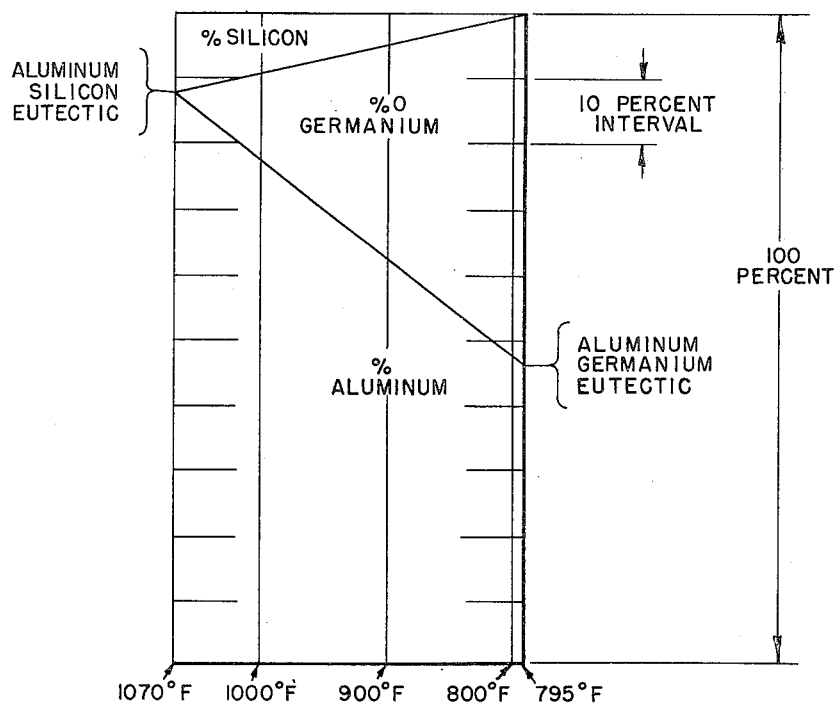
THEORETICAL LIQUIDUS TEMPERATURES FOR ALLOY COMPOSITIONS COINCIDING WITH EUTECTIC VALLEY.

2,508,008

UNITED STATES PATENT OFFICE 2,508,008

COMPOSITION FOR JOINING METAL SURFACES

Harold Hutchin Block, Los Angeles, Calif., assignor to The Garrett Corporation, Los Angeles, Calif., a corporation of California Application December 3, 1945, Serial No. 632,591

1 Claim. (Cl. 75—148)

This invention relates to the art of joining metal articles and in particular to the brazing of alloys of light metals, such as alloys of aluminum and magnesium and has as an important object the provision of new and improved soldering or brazing alloys.

In the past, brazing alloys have been based upon the aluminum silicon eutectic mixture which contains approximately 11.7% silicon and 88.3% aluminum. Such a mixture melts at 577° C. (1071° F.) and brazing is carried out in practice at temperatures somewhat above this.

The desirability of joining metal surfaces at as low a temperature as possible is due to the fact that as the fusion temperature of the alloy approaches the temperature of incipient melting of the metal being joined, the crystalline structure of the latter may be detrimentally affected. Hence it is desirable to operate at as low a temperature as possible which, up to the present, has been the theoretical minimum of the silicon aluminum eutectic mixture.

According to the present invention, however, there is provided a soldering alloy which may be used for aluminum or magnesium brazing, which alloy melts at a much lower temperature than that of the aluminum silicon eutectic and is further characterized by excellent corrosion resistance, mechanical strength, and other valuable properties of the consequent weld.

The present alloy is based upon the aluminum silicon germanium ternary mixture, the composition of which is shown in the accompanying drawing. The ordinates of the diagram represent the liquid temperatures for the ternary compositions, the corresponding ingredients of which are given by the abscissas. Thus the alloy melting at 850° F. has the approximate composition of 42.8% germanium, 55.0% aluminum and 2.0% silicon; that melting at 900° F. has the composition 33.4% germanium, 62.4% aluminum and 4.6% silicon; that melting at 950° F. has the composition 23.4% germanium, 70.6% aluminum and 6.4% silicon; while the alloy melting at 1000° F. has the composition 13.4% germanium, 77.4% aluminum and 8.6% silicon. In general, the ternary alloy may contain up to about 58% germanium and up to about 13% silicon with the remainder essentially aluminum.

It will be seen that these ternary compositions lie between that of the aluminum silicon binary alloy, designated on the chart as the aluminum silicon eutectic point, and that of the germanium aluminum binary alloy, designated on the chart as the aluminum germanium eutectic point. While the lowest melting ternary mixtures lie along the extension of these two points as drawn on the chart, it will be appreciated that higher melting mixtures of the three components may also be used.

The present alloy may be applied in torch or furnace brazing in the form of a rod or wire as well as in the foil or in sheet form. Or again, a molten bath of the alloy may be employed in dip brazing. Such alloy may also be used in powdered form, and in any event employed in conjunction with a suitable flux to clean the surfaces before joining, according to conventional practice.

A particularly advantageous property of germanium in this connection is that it does not increase the tendency of the weld to corrode as is the case with many other metals which might be used in such an alloy. Further improvement in the composition of the ternary mixture may be made by incorporation of a small amount or trace of beryllium, on the order of 0.001% to 0.010% (by weight), although up to 0.100% or even 1.000% may be used, if desired. The effect of this minute addition is to retard the oxidation of the alloy (and in particular of the aluminum component) when in the molten state so that as a consequence the resultant weld is bright and shining in contrast to one produced in the absence of beryllium.

While the present alloy is particularly applicable to, and has been here illustrated in connection with the brazing of aluminum and magnesium surfaces, it is to be understood that it may also be used as a solder for the joining of other metallic objects, such as alloys in which iron, copper, zinc, nickel, or silver are the predominant metals.

I claim as my invention:

A brazing alloy melting between about 850° F. and about 1000° F. consisting essentially of from 13.4% to 42.8% germanium, from 2.0% to 8.6% silicon and from 55% to 77.4% aluminum

HAROLD HUTCHIN BLOCK.

REFERENCES CITED

The following references are of record in the file of this patent:

UNITED STATES PATENTS

| Number | Name | Date |
|---|---|---|
| 1,691,532 | Spengler | Nov. 13, 1928 |
| 1,944,183 | Kempf et al. | Jan. 23, 1934 |
| 1,952,048 | Archer et al. | Mar. 27, 1934 |

OTHER REFERENCES

"Chemical Abstracts," vol. 34 (1940), page 7764.

U. S. Bureau of Mines Information Circular #6401 (1930), page 9.

"Chapters in the Chemistry of the Less Familiar Elements," by Hopkins, vol. 1, 1939, chapter 10, page 7.

"Metall und Erz," vol. 23 (1926), pages 682–4.